United States Patent
Huang et al.

(10) Patent No.: US 11,892,625 B2
(45) Date of Patent: Feb. 6, 2024

(54) METHOD FOR DETERMINING POSTURE OF USER, HOST, AND COMPUTER READABLE MEDIUM

(71) Applicant: HTC Corporation, Taoyuan (TW)

(72) Inventors: Chiao-Chien Huang, Taoyuan (TW); Fang Yu Cheng, Taoyuan (TW)

(73) Assignee: HTC Corporation, Taoyuan (TW)

( * ) Notice: Subject to any disclaimer, the term of this patent is extended or adjusted under 35 U.S.C. 154(b) by 0 days.

(21) Appl. No.: 17/582,007

(22) Filed: Jan. 24, 2022

(65) Prior Publication Data

US 2023/0105864 A1   Apr. 6, 2023

Related U.S. Application Data

(60) Provisional application No. 63/252,154, filed on Oct. 5, 2021.

(51) Int. Cl.
*G02B 27/00* (2006.01)
*G02B 27/01* (2006.01)
*G06F 3/01* (2006.01)

(52) U.S. Cl.
CPC ....... *G02B 27/0093* (2013.01); *G02B 27/017* (2013.01); *G06F 3/014* (2013.01); *G06F 3/017* (2013.01)

(58) Field of Classification Search
None
See application file for complete search history.

(56) References Cited

U.S. PATENT DOCUMENTS

2015/0258431 A1* 9/2015 Stafford ................ A63F 13/212
                                                                  463/31
2022/0364829 A1* 11/2022 Wallack ............... G02B 27/017

FOREIGN PATENT DOCUMENTS

| CN | 114694167 | * 12/2020 | .............. G06F 3/011 |
| TW | 200919210 | 5/2009 | |
| TW | 202006673 | 2/2020 | |
| TW | 202121120 | 6/2021 | |

OTHER PUBLICATIONS

"Office Action of Taiwan Counterpart Application", dated Nov. 16, 2023, pp 1-11.

* cited by examiner

*Primary Examiner* — Ifedayo B Iluyomade
(74) *Attorney, Agent, or Firm* — JCIPRNET

(57) ABSTRACT

The disclosure provides a method for determining a posture of a user, a host, and a computer readable medium. The method includes: detecting a relative position between a first wearable device and a second wearable device; and in response to determining that the relative position between the first wearable device and the second wearable device satisfies a predetermined relative position, determining the posture of the user at least based on the relative position between the first wearable device and the second wearable device.

17 Claims, 15 Drawing Sheets

METHOD FOR DETERMINING POSTURE OF USER, HOST, AND COMPUTER READABLE MEDIUM

CROSS-REFERENCE TO RELATED APPLICATION

This application claims the priority benefit of U.S. provisional application Ser. No. 63/252,154, filed on Oct. 5, 2021. The entirety of the above-mentioned patent application is hereby incorporated by reference herein and made a part of this specification.

BACKGROUND

1. Field of the Invention

The present disclosure generally relates to a posture detection mechanism, in particular, to a method for determining a posture of a user, a host, and a computer readable medium.

2. Description of Related Art

In systems such as virtual reality (VR) systems and augmented reality (AR) systems, many applications are designed to interact with the hands of the user. Conventionally, the above systems perform hand tracking when the hand(s) of the user is in the field of view (FOV) of the front camera of the head-mounted display (HMD) of the systems. In this case, the hand tracking cannot be performed when the hand(s) of the user is not in the FOV of the HMD. In addition, the performance of hand tracking may not be satisfying when the user holds objects in the user's hand.

SUMMARY OF THE INVENTION

Accordingly, the disclosure is directed to a method for determining a posture of a user, a host, and a computer readable medium which may be used to solve the above technical problems.

The embodiments of the disclosure provide a method for determining a posture of a user, adapted to a host. The method includes: detecting a relative position between a first wearable device and a second wearable device; and in response to determining that the relative position between the first wearable device and the second wearable device satisfies a predetermined relative position, determining the posture of the user at least based on the relative position between the first wearable device and the second wearable device.

The embodiments of the disclosure provide a host, including a storage circuit and a processor. The storage circuit stores a program code. The processor is coupled to the storage circuit and accesses the program code to perform: detecting a relative position between a first wearable device and a second wearable device; and in response to determining that the relative position between the first wearable device and the second wearable device satisfies a predetermined relative position, determining the posture of the user at least based on the relative position between the first wearable device and the second wearable device.

The embodiments of the disclosure provide a computer readable medium, the computer readable medium recording an executable computer program, the executable computer program being loaded by a host to perform steps of: detecting a relative position between a first wearable device and a second wearable device; and in response to determining that the relative position between the first wearable device and the second wearable device satisfies a predetermined relative position, determining the posture of the user at least based on the relative position between the first wearable device and the second wearable device.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the disclosure.

DESCRIPTION OF THE EMBODIMENTS

Figure 1:
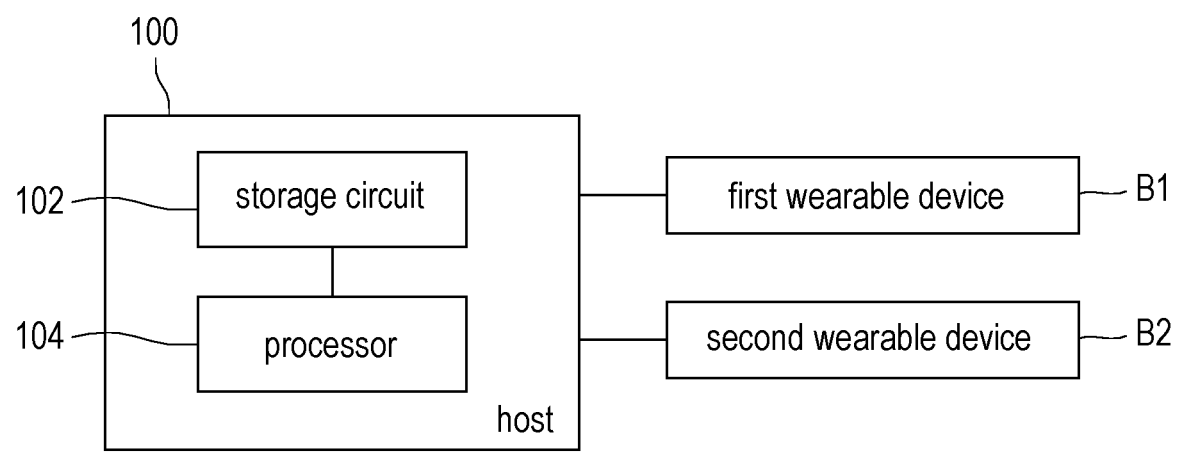
FIG. 1 shows a schematic diagram of a host, a first wearable device, and a second wearable device according to an embodiment of the disclosure.

Reference will now be made in detail to the present preferred embodiments of the invention, examples of which are illustrated in the accompanying drawings. Wherever possible, the same reference numbers are used in the drawings and the description to refer to the same or like parts.

See FIG. 1, which shows a schematic diagram of a host, a first wearable device, and a second wearable device according to an embodiment of the disclosure. In FIG. 1, the host 100 can be any device capable of tracking the first wearable device B1 and the second wearable device B2. In one embodiment, the host 100 can be an HMD that provides VR services/contents, and the first wearable device B1 and the second wearable device B2 can be smart devices that can be worn by the user/wearer of the HMD and trackable to the host 100. In one embodiment, the first wearable device B1 and the second wearable device B2 can be a pair of ring-shaped devices, such as smart bracelets, smart rings that can be worn on the wrists or fingers of the user. In other embodiments, the first wearable device B1 and the second wearable device B2 can also be other kind of trackable devices that can be attached to the user's hands, but the disclosure is not limited thereto.

In some embodiments, the first wearable device B1 and the second wearable device B2 can be disposed with motion detection elements, such as inertial measurement units (IMU), and the motion detection elements on the first wearable device B1 and the second wearable device B2 can provide measurements (e.g., 6 degrees of freedom (DOF) measurements) in response to the movements of the first wearable device B1 and the second wearable device B2.

In some embodiments, the first wearable device B1 and the second wearable device B2 can be disposed with light emitting elements (e.g., infrared light emitting diodes (IR LED)) for the host 100 (e.g., the HMD) to track the first wearable device B1 and the second wearable device B2. For example, in one embodiment, the light emitting elements can emit visible/invisible lights for the camera (e.g., the front camera) of the HMD to capture as images. In this case, the HMD can determine the poses/positions of the first wearable device B1 and the second wearable device B2 based on the light distribution in the images. In one embodiment, the HMD can determine the poses/positions of the first wearable device B1 and the second wearable device B2 via performing inside-out tracking mechanisms, but the disclosure is not limited thereto.

In some embodiments, in the cases where the first wearable device B1 and the second wearable device B2 are not in the FOV of the (front) camera of the HMD, the HMD can determine the poses/positions of the first wearable device B1 and the second wearable device B2 based on the measurements (e.g., the 6DOF measurements) provided by the motion detection elements. In some embodiments, in the cases where the first wearable device B1 and the second wearable device B2 are in the FOV of the (front) camera of the HMD, the HMD can determine the poses/positions of the first wearable device B1 and the second wearable device B2 by considering the measurements provided by the motion detection elements and the result of the inside-out tracking, but the disclosure is not limited thereto.

In some embodiments, the HMD can track the pose/positions of itself via performing the inside-out tracking mechanisms. In the disclosure, details of the inside-out tracking mechanism can be referred to the related prior arts, and the details thereof would not be further described.

In FIG. 1, the host 100 includes a storage circuit 102 and a processor 104. The storage circuit 102 is one or a combination of a stationary or mobile random access memory (RAM), read-only memory (ROM), flash memory, hard disk, or any other similar device, and which records a plurality of modules and/or program codes that can be executed by the processor 104.

The processor 104 is coupled with the storage circuit 102, and the processor 104 may be, for example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like.

In the embodiments of the disclosure, the processor 104 can access the modules/program codes stored in the storage circuit 102 to implement the method for determining a posture of a user provided in the disclosure, which would be further discussed in the following.

Figure 2:
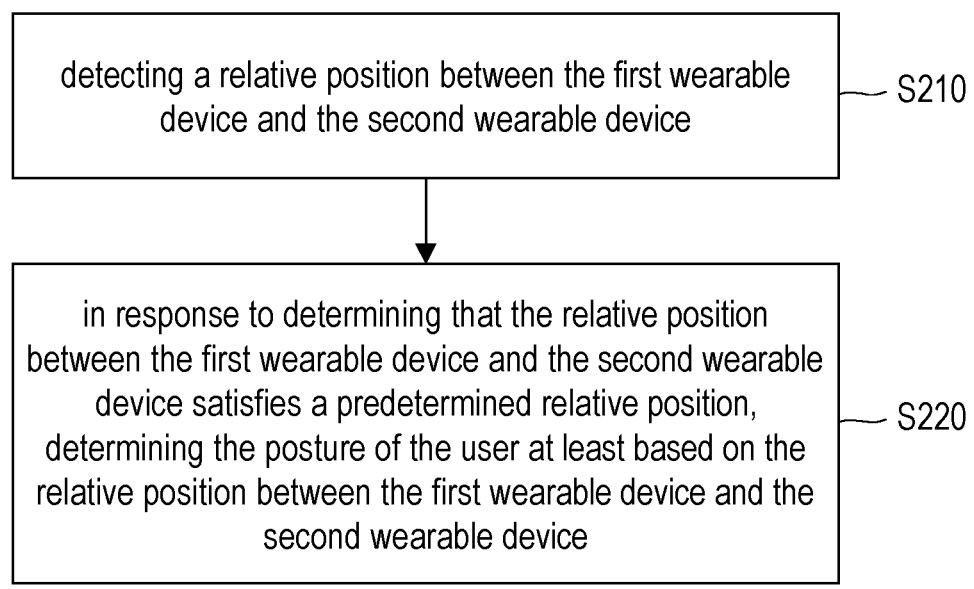
FIG. 2 shows a flow chart of the method for determining a posture of a user according to an embodiment of the disclosure.

See FIG. 2, which shows a flow chart of the method for determining a posture of a user according to an embodiment of the disclosure. The method of this embodiment may be executed by the host 100 in FIG. 1, and the details of each step in FIG. 2 will be described below with the components shown in FIG. 1.

Firstly, in step S210, the processor 104 detecting a relative position between the first wearable device B1 and the second wearable device B2. As mentioned in the above, the processor 104 can determine the poses/positions of the first wearable device B1 and the second wearable device B2 based on the measurements provided by the motion detection elements and/or the result of the inside-out tracking mechanisms. After obtaining the poses/positions of the first wearable device B1 and the second wearable device B2, the processor 104 can accordingly determine the relative position between the first wearable device B1 and the second wearable device B2, but the disclosure is not limited thereto.

In step S220, in response to determining that the relative position between the first wearable device B1 and the second wearable device B2 satisfies a predetermined relative position, the processor 104 determines the posture of the user at least based on the relative position between the first wearable device B1 and the second wearable device B2. For better understanding the concept of the disclosure, the following embodiments would be used for further discussions.

For facilitating the following discussions, the host 100 will be assumed to be the HMD providing VR services, and the first wearable device B1 and the second wearable device B2 are smart bracelets connected to the HMD and worn on the wrists of the user of the HMD, but the disclosure is not limited thereto.

Figure 3A:
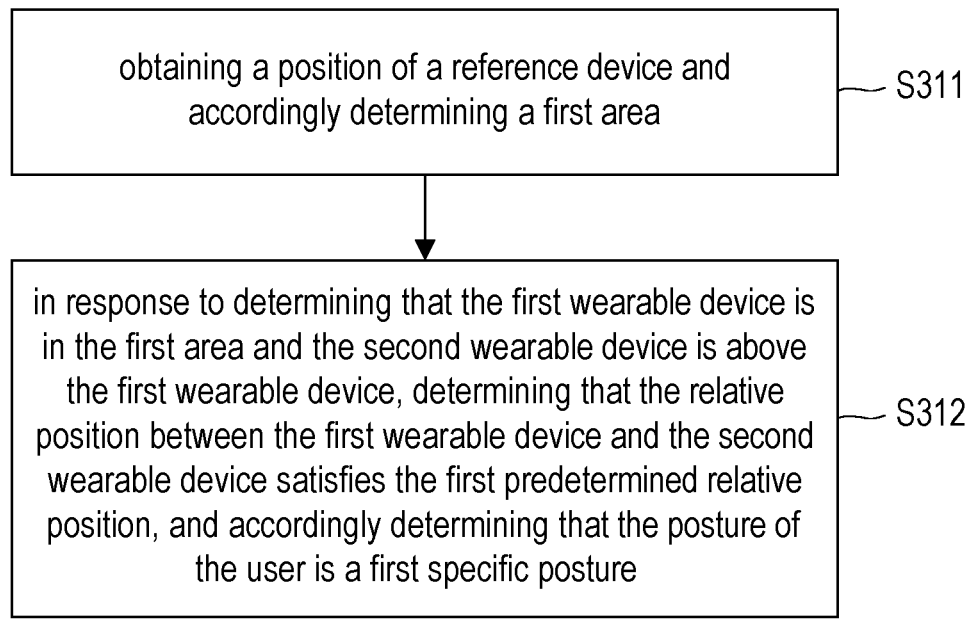
FIG. 3A shows a flow chart of determining the posture of the user according to a first embodiment of the disclosure.
Figure 3B:
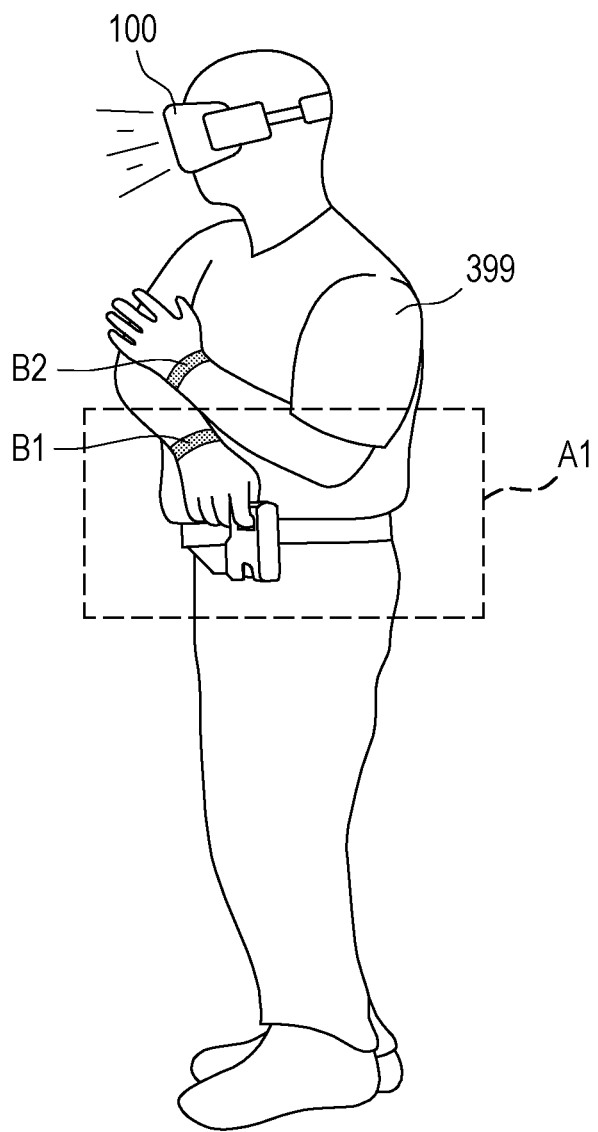
FIG. 3B shows an application scenario according to the first embodiment of the disclosure.

See FIG. 3A, which shows a flow chart of determining the posture of the user according to a first embodiment of the disclosure. The flow in FIG. 3A may be executed by the host 100 in FIG. 1, and the details of each step in FIG. 3A will be described with the components shown in FIG. 1 and FIG. 3B, wherein FIG. 3B shows an application scenario according to the first embodiment of the disclosure.

In step S311, the processor 104 obtains a position of a reference device and accordingly determining a first area A1. In FIG. 3B, the considered reference device can be the host 100, and the first area A1 can be determined to be a waist area of the user 399. In the first embodiment, the processor 104 can estimate the waist area of the user 399 based on the height of the host 100. For example, since the height of the host 100 is close to the height of the user 399, the processor 104 can multiply the height of the host 100 by each of a first specific ratio and a second specific ratio to determine an upper bound and a lower bound of the waist area, but the disclosure is not limited thereto. In one embodiment, the first and second specific ratios can be determined based on regular human body proportions. For example, the waist area of a human may be around 60% and 70% of the human height, and hence the processor 104 can use 70% and 60% as the first and second specific ratios, respectively, but the disclosure is not limited thereto.

In other embodiments, the reference device can be determined to be other devices, and the processor 104 can accordingly determine the waist area based on the type of the reference device. In one embodiment, if the reference device is a smart device that is usually disposed/worn on the waist of the user 399, the processor 104 can directly use the position of the reference device to determine the waist area. For example, the processor 104 can determine a specific region around the reference device as the waist area, but the disclosure is not limited thereto. In other embodiments, the first area A1 can also be other areas that can be determined based on the position of the reference device.

In the first embodiment, the predetermined relative position can be a first predetermined relative position where the first wearable device B1 is in the first area A1 and the second wearable device B2 is above the first wearable device B1 (i.e., the scenario shown in FIG. 3B), but the disclosure is not limited thereto.

Therefore, in the scenario shown in FIG. 3B, the processor 104 can subsequently perform step S312. In step S312, in response to determining that the first wearable device B1 is in the first area A1 and the second wearable device B2 is above the first wearable device B1, the processor 104 determines that the relative position between the first wearable device B1 and the second wearable device B2 satisfies the first predetermined relative position, and the processor 104 accordingly determines that the posture of the user is a first specific posture.

In the first embodiment, the first specific posture can be a first standard posture for a person to be ready to draw a gun at the waist of this person. That is, when the processor 104 determines that the relative position between the first wearable device B1 and the second wearable device B2 satisfies the first predetermined relative position, the processor 104 can accordingly determine that the posture of the user 399 is the first standard posture, but the disclosure is not limited thereto.

In the first embodiment, the processor 104 can further consider the pose of the HMD to determine whether the posture of the user is the first specific posture.

Figure 3C:
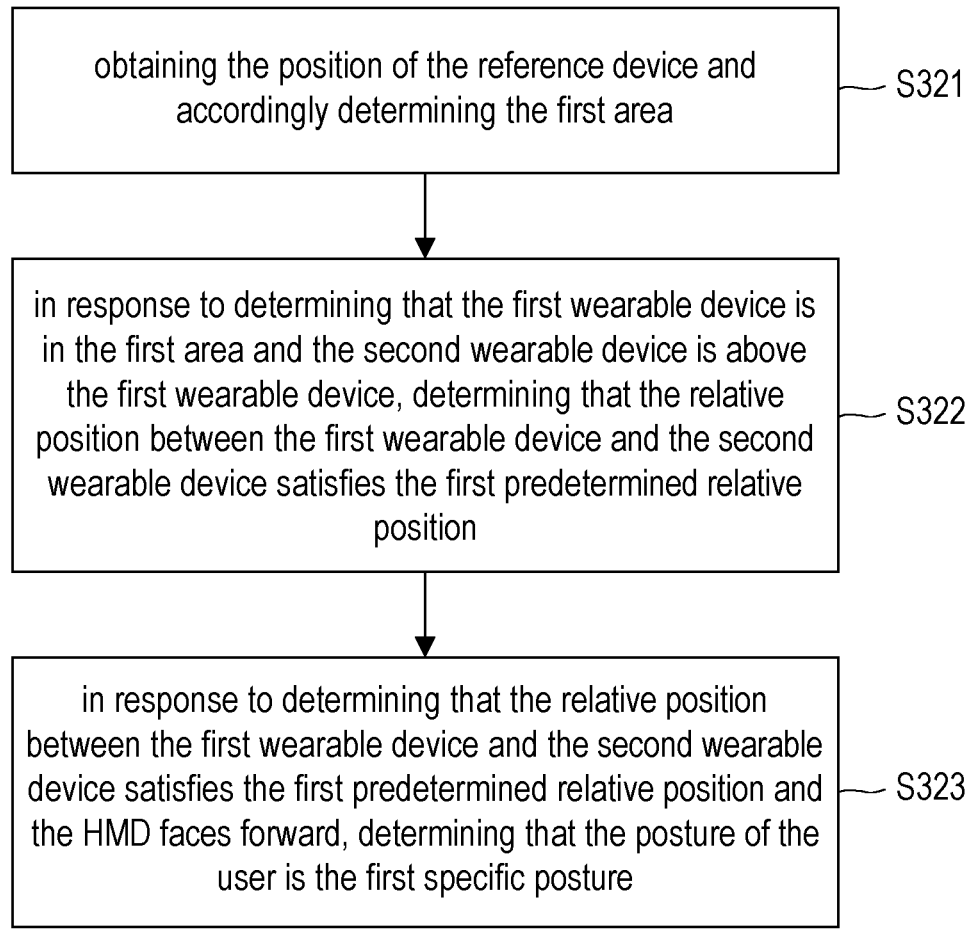
FIG. 3C shows another flow chart of determining the posture of the user according to the first embodiment of the disclosure.

See FIG. 3C, which shows another flow chart of determining the posture of the user according to the first embodiment of the disclosure. The flow in FIG. 3C may be executed by the host 100 in FIG. 1, and the details of each step in FIG. 3C will be described with the components shown in FIG. 1 and FIG. 3B.

In step S321, the processor 104 obtains the position of the reference device and accordingly determining the first area A1. In step S322, in response to determining that the first wearable device B1 is in the first area A1 and the second wearable device B2 is above the first wearable device B1, the processor 104 determines that the relative position between the first wearable device B1 and the second wearable device B2 satisfies the first predetermined relative position. Details of the steps S321 and S322 can be referred to the details of the steps S311 and S312, which would not be repeated herein.

In the first embodiment, the processor 104 can further determine whether the HMD faces forward before determining that the posture of the user 399 is the first specific posture. Specifically, if the considered first specific posture is the first standard posture in the above, besides the positions of the hands (which are characterized by the relative positions of the first wearable device B1 and the second wearable device B2) need to be placed at proper places (as shown in FIG. 3B), the user 399 also needs to look forward. In FIG. 3B, if the user 399 looks forward, the HMD (i.e., the host 100) would face forward as well.

Therefore, in step S323, in response to determining that the relative position between the first wearable device B1 and the second wearable device B2 satisfies the first predetermined relative position and the HMD faces forward, the processor 104 determines that the posture of the user is the first specific posture, but the disclosure is not limited thereto.

In the first embodiment, the host 100 can provide a visual content (e.g., the VR content) to the user 399, and the visual content can be adjusted in response to the posture of the user 399.

Figure 3D:
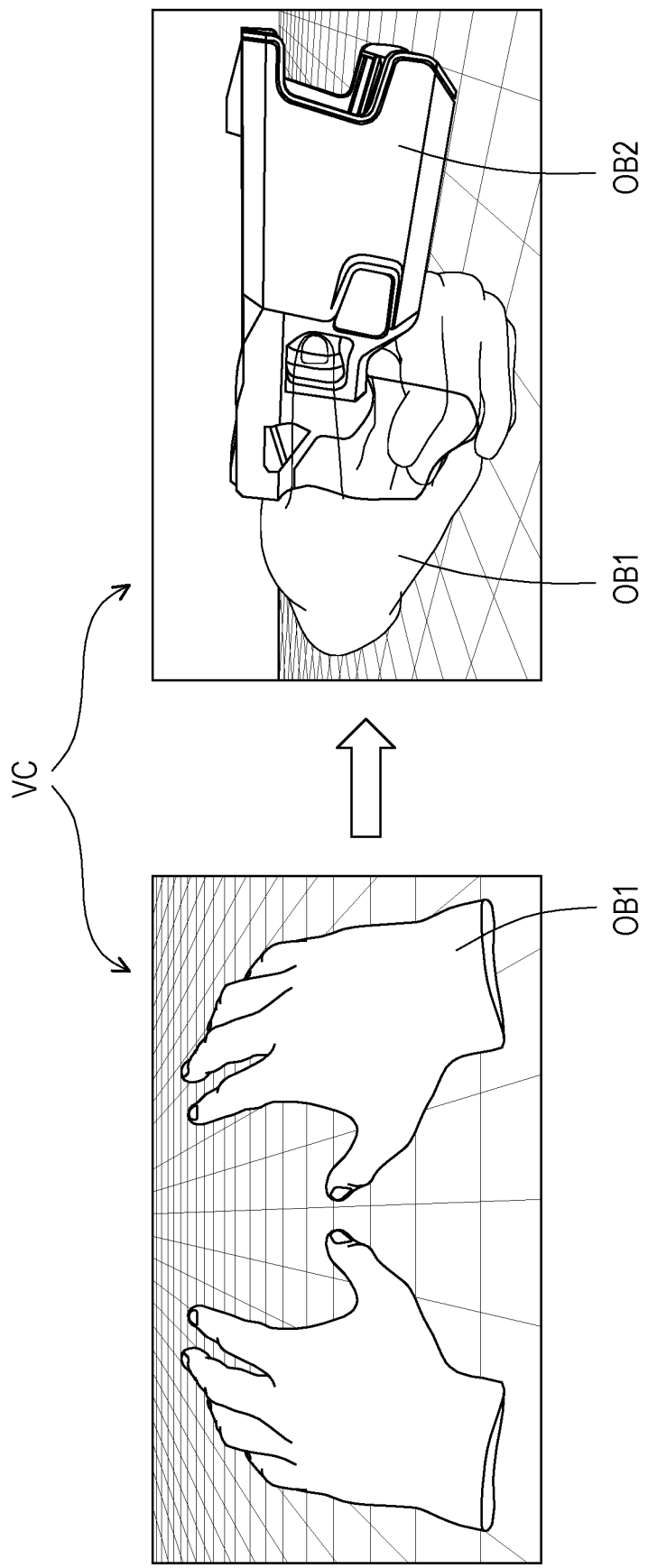
FIG. 3D shows a visual content adjustment according to the first embodiment of the disclosure.

See FIG. 3D, which shows a visual content adjustment according to the first embodiment of the disclosure. In FIG. 3D, the visual content VC can correspond to a training program for training the user 399 to use a gun, but the disclosure is not limited thereto.

In the visual content VC, the processor 104 can show a hand object OB1 corresponding to the hand of the user 399. In one embodiment, the appearances/positions of the hand object OB1 can be determined based on a hand gesture tracking mechanism performed by the HMD based on the images captured by the front camera of the HMD, but the disclosure is not limited thereto. In one embodiment, before determining that the posture of the user 399 is the first specific posture (e.g., the first standard posture), the hand object OB1 can be shown in an empty-handed state. That is, the hand object OB1 is shown as a bare hand carrying/holding nothing.

In the first embodiment, in response to determining that the posture of the user is the first specific posture, the processor 104 can generate a handheld object OB2 in the visual content VC and adjust the hand object OB1 to be holding the handheld object OB2. In one embodiment, the handheld object OB2 can be a gun object, but the disclosure is not limited thereto.

Taking the scenario in FIG. 3B as an example, if the user 399 turns his/her head to look at the first area A1 before the posture of the user 399 is determined to be the first specific posture, the user 399 may see a bare hand object at his/her waist. Next, if the user 399 turns his/her head to look at the first area A1 after the posture of the user 399 is determined to be the first specific posture, the user 399 may see a hand object that holds a gun object. That is, the gun object is generated after the processor 104 determines that the posture of the user 399 is the first specific posture, but the disclosure is not limited thereto.

Figure 4A:
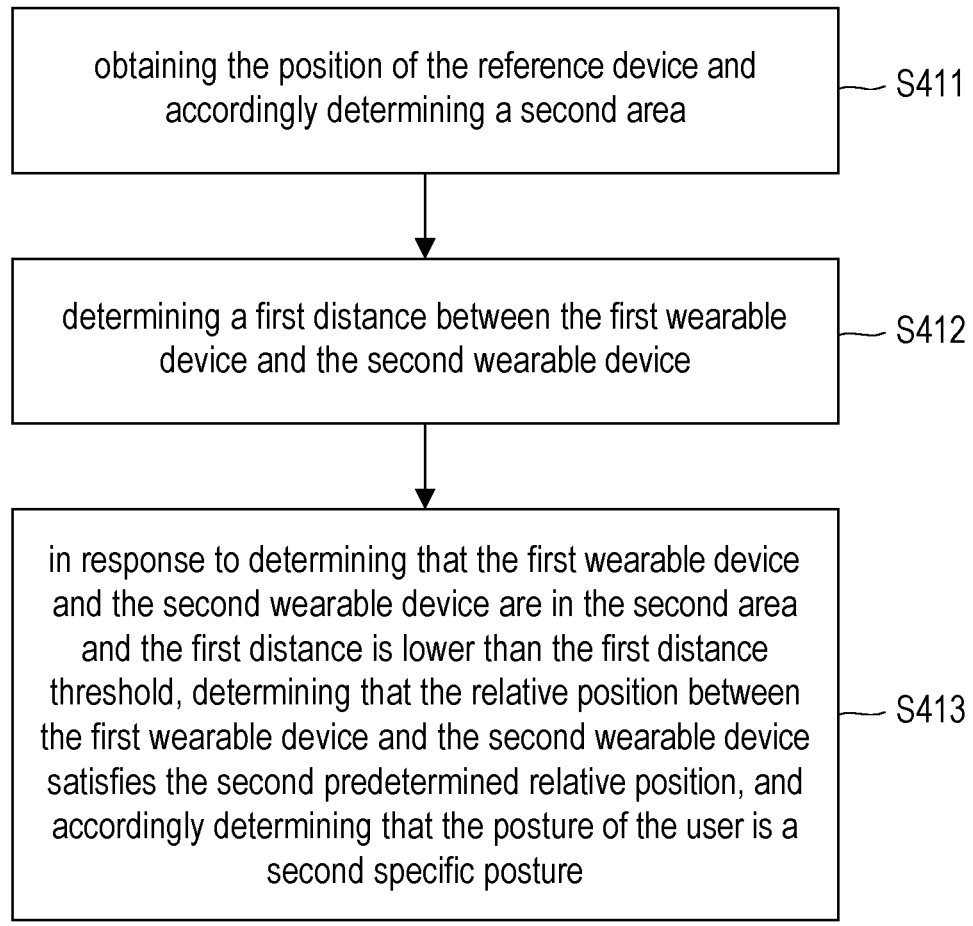
FIG. 4A shows a flow chart of determining the posture of the user according to a second embodiment of the disclosure.
Figure 4B:
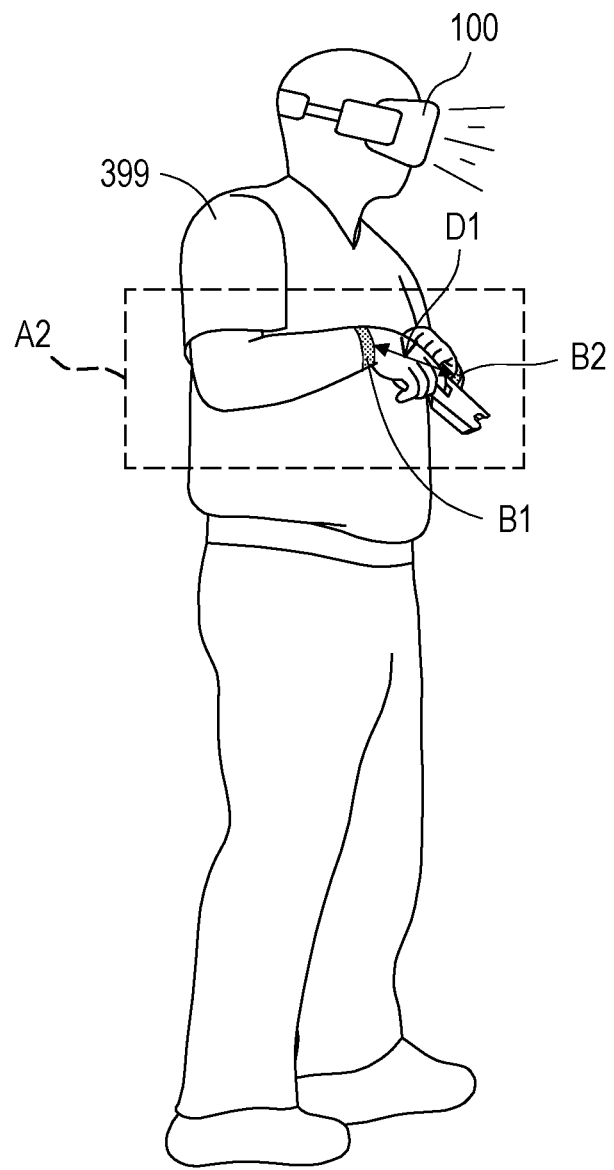
FIG. 4B shows an application scenario according to the second embodiment of the disclosure.

See FIG. 4A, which shows a flow chart of determining the posture of the user according to a second embodiment of the disclosure. The flow in FIG. 4A may be executed by the host 100 in FIG. 1, and the details of each step in FIG. 4A will be described with the components shown in FIG. 1 and FIG. 4B, wherein FIG. 4B shows an application scenario according to the second embodiment of the disclosure.

In step S411, the processor 104 obtains the position of the reference device and accordingly determining a second area A2. In FIG. 4B, the considered reference device can be the host 100, and the second area A2 can be determined to be a chest area of the user 399. In the second embodiment, the processor 104 can estimate the chest area of the user 399 based on the height of the host 100. For example, since the height of the host 100 is near the height of the user 399, the processor 104 can multiply the height of the host 100 by each of a third specific ratio and a fourth specific ratio to determine an upper bound and a lower bound of the chest area, but the disclosure is not limited thereto. In one embodiment, the third and fourth specific ratios can be determined based on regular human body proportions, and the principle of choosing the third and fourth specific ratios can be referred to the principle of choosing the first and second specific ratios, but the disclosure is not limited thereto.

In other embodiments, the reference device can be determined to be other devices, and the processor 104 can accordingly determine the chest area based on the type of the reference device. In one embodiment, if the reference device is a smart device (e.g., a smart necklace) that is usually disposed/worn on the chest of the user 399, the processor 104 can directly use the position of the reference device to determine the chest area. For example, the processor 104 can determine a specific region around the reference device as the chest area, but the disclosure is not limited thereto. In other embodiments, the second area A2 can also be other areas that can be determined based on the position of the reference device.

In step S412, the processor 104 determines a first distance D1 between the first wearable device B1 and the second wearable device B2. In the second embodiment, after obtaining the poses/positions of the first wearable device B1 and the second wearable device B2, the processor 104 can accordingly determine the first distance D1 between the first wearable device B1 and the second wearable device B2, but the disclosure is not limited thereto.

In the second embodiment, the predetermined relative position can be a second predetermined relative position where the first wearable device B1 and the second wearable device B2 are in the second area A2 and the first distance D1 is lower than a first distance threshold (i.e., the scenario shown in FIG. 4B), but the disclosure is not limited thereto. In different embodiments, the first distance threshold can be any value characterizing that the first wearable device B1 and the second wearable device B2 is close enough to each other.

Therefore, in the scenario shown in FIG. 4B, the processor 104 can subsequently perform step S413. In step S413, in response to determining that the first wearable device B1 and the second wearable device B2 are in the second area A2 and the first distance D1 is smaller than the first distance threshold, the processor 104 determines that the relative position between the first wearable device B1 and the second wearable device B2 satisfies the second predetermined relative position, and the processor 104 accordingly determines that the posture of the user 399 is a second specific posture.

In the second embodiment, the second specific posture can be a second standard posture for a person to be ready to aim with a gun, also known as an SUL position. That is, when the processor 104 determines that the relative position between the first wearable device B1 and the second wearable device B2 satisfies the second predetermined relative position, the processor 104 can accordingly determine that the posture of the user 399 is the second standard posture, but the disclosure is not limited thereto.

In the second embodiment, the processor 104 can further consider the pose of the HMD to determine whether the posture of the user is the second specific posture.

Figure 4C:
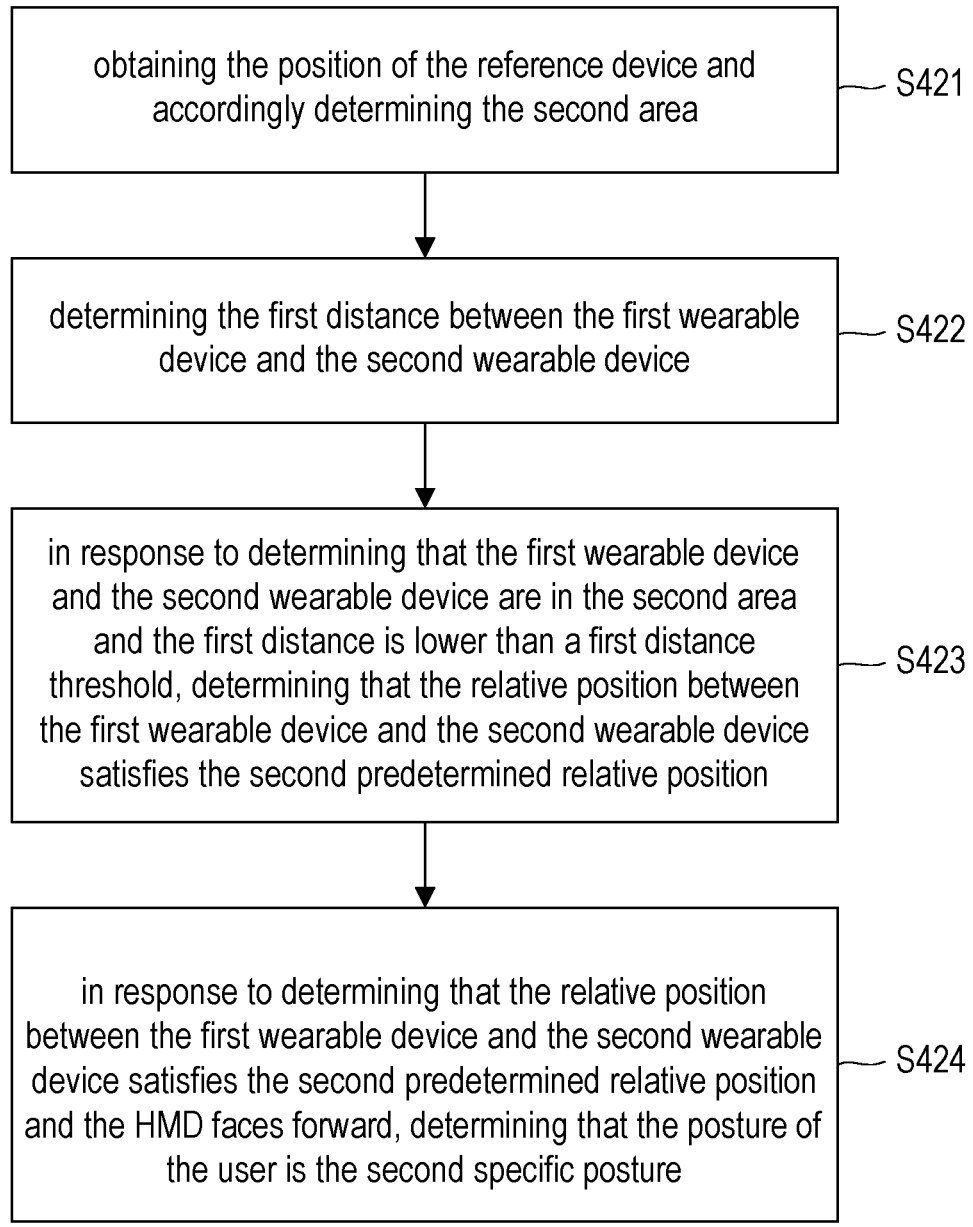
FIG. 4C shows another flow chart of determining the posture of the user according to the second embodiment of the disclosure.

See FIG. 4C, which shows another flow chart of determining the posture of the user according to the second embodiment of the disclosure. The flow in FIG. 4C may be executed by the host 100 in FIG. 1, and the details of each step in FIG. 4C will be described with the components shown in FIG. 1 and FIG. 4B.

In step S421, the processor 104 obtains the position of the reference device and accordingly determines the second area A2. In step S422, the processor 104 determines the first distance D1 between the first wearable device B1 and the second wearable device B2. In step S423, in response to determining that the first wearable device B1 and the second wearable device B2 are in the second area A1 and the first distance D1 is lower than the first distance threshold, the processor 104 determines that the relative position between the first wearable device B1 and the second wearable device B2 satisfies the second predetermined relative position. Details of the steps S421 to S423 can be referred to the details of the steps S411 and S413, which would not be repeated herein.

In the second embodiment, the processor 104 can further determine whether the HMD faces forward before determining that the posture of the user 399 is the second specific posture. Specifically, if the considered second specific posture is the second standard posture in the above, besides the positions of the hands (which are characterized by the relative positions of the first wearable device B1 and the second wearable device B2) need to be placed at proper places (as shown in FIG. 4B), the user 399 also needs to look forward. In FIG. 4B, if the user 399 looks forward, the HMD (i.e., the host 100) would face forward as well.

Therefore, in step S424, in response to determining that the relative position between the first wearable device B1 and the second wearable device B2 satisfies the second predetermined relative position and the HMD faces forward, the processor 104 determines that the posture of the user 399 is the second specific posture, but the disclosure is not limited thereto.

Figure 5A:
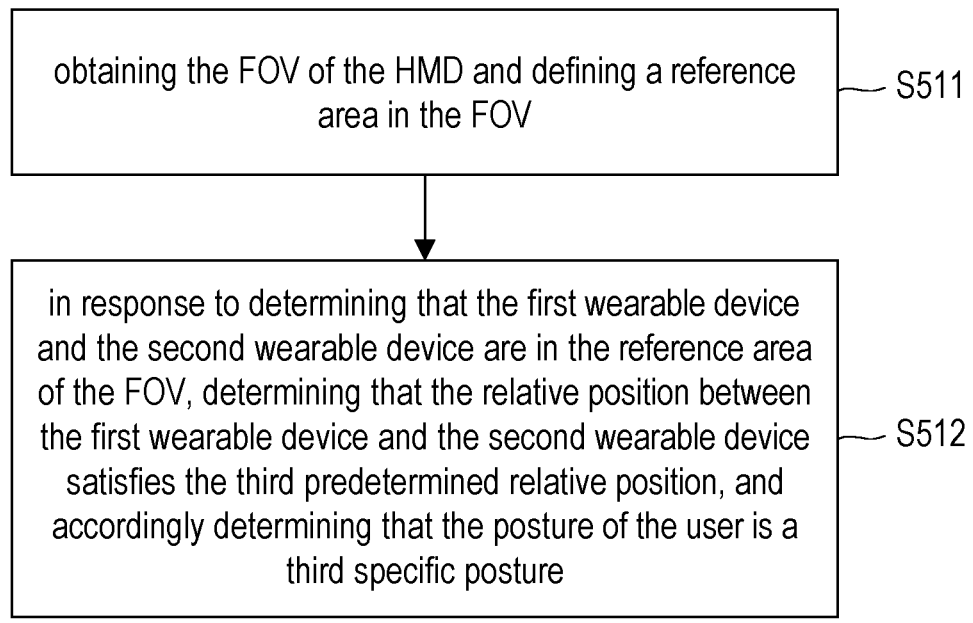
FIG. 5A shows a flow chart of determining the posture of the user according to a third embodiment of the disclosure.
Figure 5B:
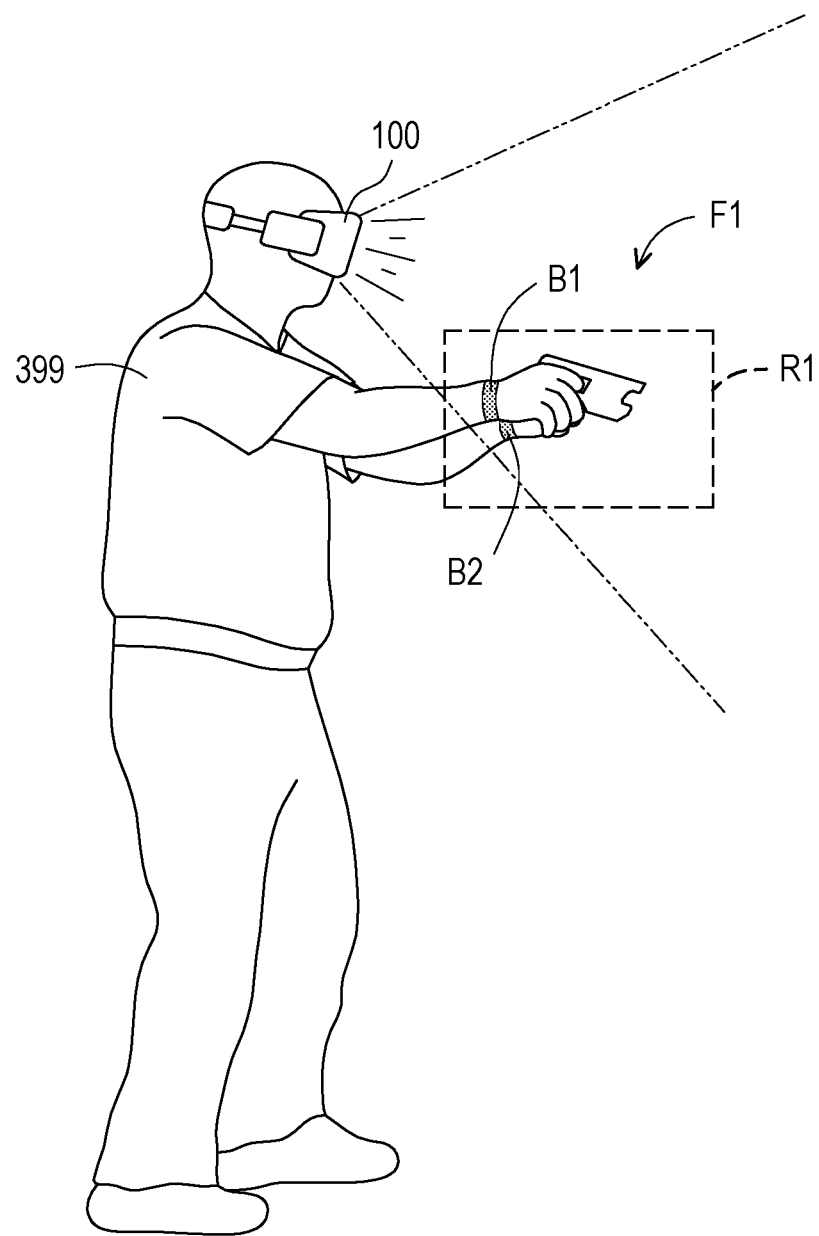
FIG. 5B shows an application scenario according to the third embodiment of the disclosure.

See FIG. 5A, which shows a flow chart of determining the posture of the user according to a third embodiment of the disclosure. The flow in FIG. 5A may be executed by the host 100 in FIG. 1, and the details of each step in FIG. 5A will be described with the components shown in FIG. 1 and FIG. 5B, wherein FIG. 5B shows an application scenario according to the third embodiment of the disclosure.

Firstly, in step S511, the processor 104 obtains the FOV F1 of the HMD and defines a reference area R1 in the FOV F1. In the third embodiment, the reference area R1 can be an area where the hands of the user 399 would appear in the FOV F1 when the user 399 properly aims with a gun, but the disclosure is not limited thereto.

In the third embodiment, the predetermined relative position can be a third predetermined relative position where the first wearable device B1 and the second wearable device B2 are in the reference area R1 of the FOV F1 (i.e., the scenario shown in FIG. 5B), but the disclosure is not limited thereto.

Therefore, in the scenario shown in FIG. 5B, the processor 104 can subsequently perform step S512. In step S512, in response to determining that the first wearable device B1 and the second wearable device B2 are in the reference area R1 of the FOV F1, the processor 104 determines that the relative position between the first wearable device B1 and the second wearable device B2 satisfies the third predetermined relative position, and the processor 104 accordingly determines that the posture of the user 399 is a third specific posture.

In the third embodiment, the third specific posture can be a third standard posture for a person to be properly aiming with a gun. That is, when the processor 104 determines that the relative position between the first wearable device B1 and the second wearable device B2 satisfies the third predetermined relative position, the processor 104 can accordingly determine that the posture of the user 399 is the third standard posture, but the disclosure is not limited thereto.

In the third embodiment, the processor 104 can further consider whether a specific object (e.g., a real gun) is also detected in the reference area R1 of the FOV F1 during determining whether the posture of the user is the third specific posture.

Figure 5C:
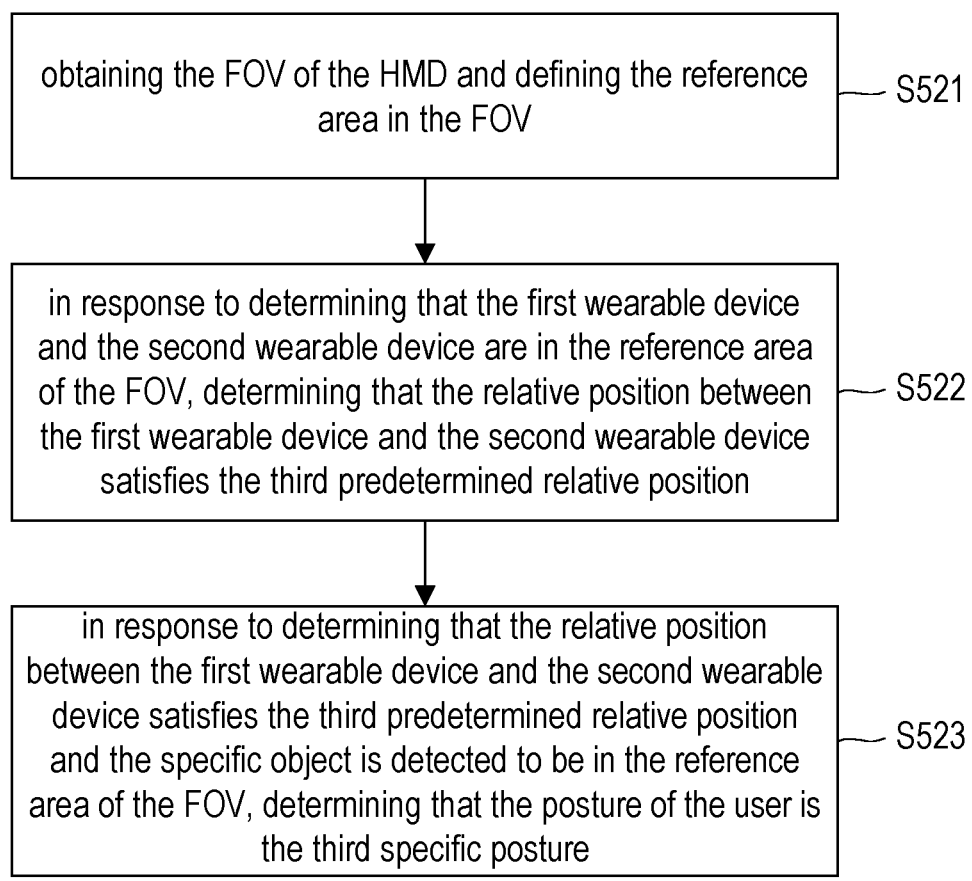
FIG. 5C shows another flow chart of determining the posture of the user according to the third embodiment of the disclosure.

See FIG. 5C, which shows another flow chart of determining the posture of the user according to the third embodiment of the disclosure. The flow in FIG. 5C may be executed by the host 100 in FIG. 1, and the details of each step in FIG. 5C will be described with the components shown in FIG. 1 and FIG. 5B.

In step S521, the processor 104 obtains the FOV F1 of the HMD and defines the reference area R1 in the FOV F1. In step S522, in response to determining that the first wearable device B1 and the second wearable device B2 are in the reference area R1 of the FOV F1, the processor 104 determines that the relative position between the first wearable device B1 and the second wearable device B2 satisfies the third predetermined relative position. Details of the steps S521 and S522 can be referred to the details of the steps S511 and S512, which would not be repeated herein.

In the third embodiment, the processor 104 can further determine whether the specific object (e.g., a real gun) is detected to be in the reference area R1 of the FOV F1. Specifically, if the considered third specific posture is the third standard posture in the above, besides the positions of the hands (which are characterized by the relative positions of the first wearable device B1 and the second wearable device B2) need to be placed at proper places (as shown in FIG. 5B), the user 399 also needs to hold a real gun. In FIG. 5B, if the user 399 holds a real gun, the real gun would be detected in the reference area R1 as well.

Therefore, in step S523, in response to determining that the relative position between the first wearable device B1 and the second wearable device B2 satisfies the third predetermined relative position and the specific object is detected to be in the reference area R1 of the FOV F1, the processor 104 determines that the posture of the user is the third specific posture, but the disclosure is not limited thereto.

In the third embodiment, the processor 104 can control the front camera of the HMD to capture an image based on the FOV F1 and input the image to a pre-trained model, wherein the pre-trained model detects whether the specific object exists in the reference area R1 of the FOV F1 based on the image.

In various embodiments, the pre-trained model can be a machine learning model, a neural network model, a deep learning model or any other similar models, but the disclosure is not limited thereto. In one embodiment, for making the model capable of performing the above detection, the training procedure of the model can be properly designed. For example, the model can be trained with a training data set, which includes a plurality of training data, and each training data can be an image corresponding to a viewing angle of a person holding a gun with both hands. In this case, the model can learn the features for detecting whether an image includes a gun held by hands, but the disclosure is not limited thereto.

In the third embodiment, after determining that the posture of the user is the third specific posture, the processor 104 can further determine that the first wearable device B1 and the second wearable device B2 experience a backlash force. If yes, the processor 104 can accordingly determine that the gun has been triggered to fire. In one embodiment, the processor 104 can obtain the 6DOF measurements provided by the first wearable device B1 and the second wearable device B2 and accordingly calculate a root-sum-square of the 6DOF measurements. In one embodiment, in response to determining that the root-sum-square of the 6DOF measurements is higher than a predetermined threshold, the processor 104 can determine that the first wearable device B1 and the second wearable device B2 experience a backlash force, but the disclosure is not limited thereto.

In one embodiment, the processor 104 can determine whether that a variation of the relative position between the first wearable device B1 and the second wearable device B2 indicates that the posture of the user 399 sequentially change among the first specific posture, the second specific posture and the third specific posture. In one embodiment, in response to determining that the variation of the relative position between the first wearable device and the second wearable device indicates that the posture of the user sequentially change among the first specific posture, the second specific posture and the third specific posture, the processor 104 can determine that the user 399 has passed a sequence of posture test.

Specifically, as mentioned in the above, the processor 104 can provide the visual content VC corresponding to a training program for training the user 399 to use a gun. In one embodiment, the training program can ask the user 399 to sequentially do the first specific posture, the second specific posture and the third specific posture as a sequence of posture test, and the user 399 can accordingly do the first specific posture, the second specific posture and the third specific posture in sequence. If the user 399 properly does the first specific posture, the second specific posture and the third specific posture in sequence, the variation of the relative position between the first wearable device B1 and the second wearable device B2 would sequentially become the first predetermined relative position, the second predetermined relative position, and the third predetermined relative position. In this case, the variation of the relative position between the first wearable device B1 and the second wearable device B2 would indicate that the posture of the user 399 sequentially change among the first specific posture, the second specific posture and the third specific posture, and hence the processor 104 can determine that the user 399 has passed the sequence of posture test of the training program, but the disclosure is not limited thereto.

Figure 6A:
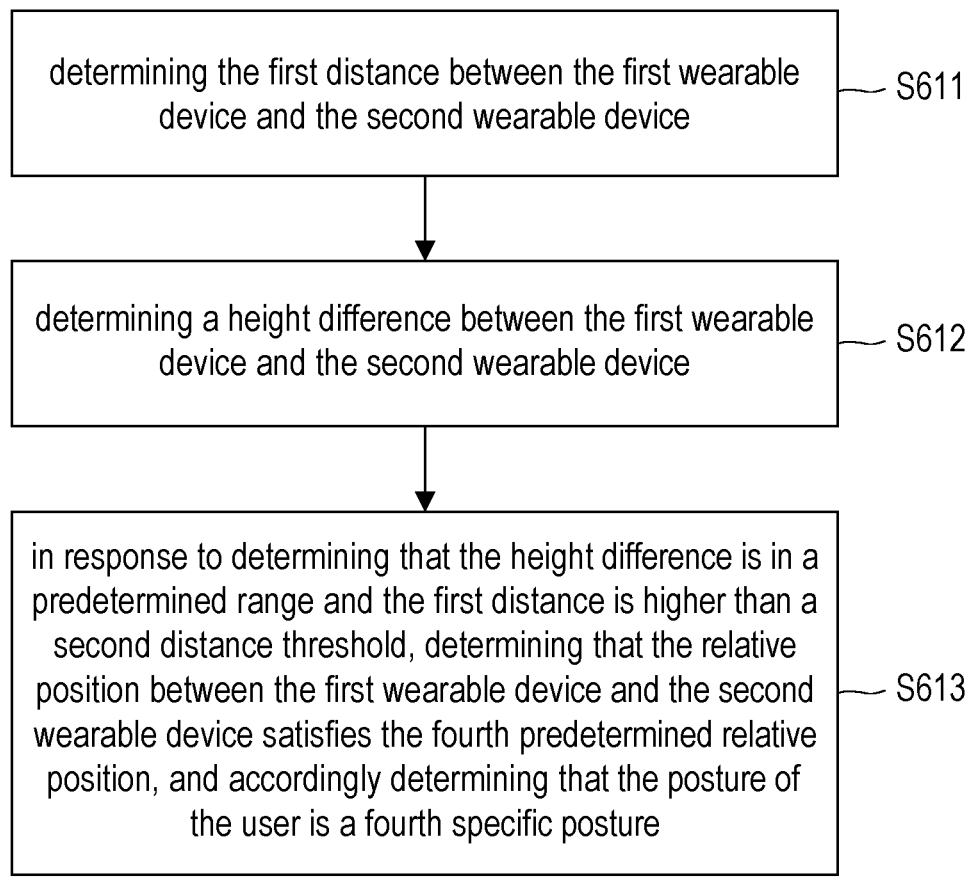
FIG. 6A shows a flow chart of determining the posture of the user according to a fourth embodiment of the disclosure.
Figure 6B:
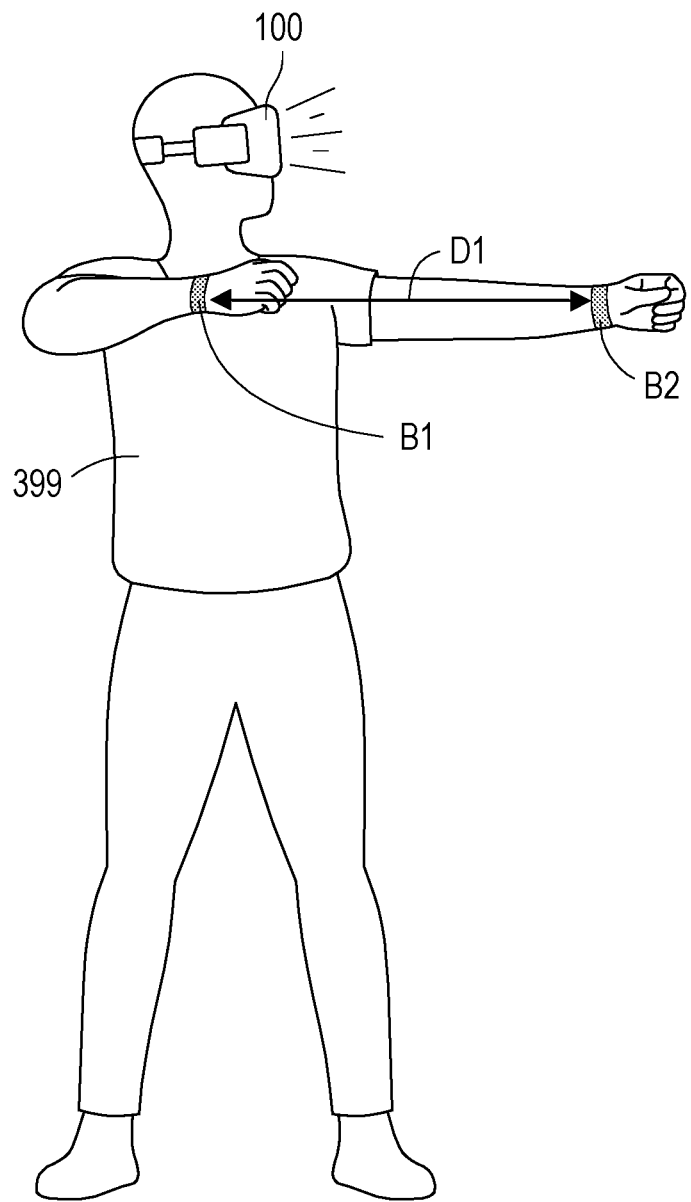
FIG. 6B shows an application scenario according to the fourth embodiment of the disclosure.

See FIG. 6A, which shows a flow chart of determining the posture of the user according to a fourth embodiment of the disclosure. The flow in FIG. 6A may be executed by the host 100 in FIG. 1, and the details of each step in FIG. 6A will be described with the components shown in FIG. 1 and FIG. 6B, wherein FIG. 6B shows an application scenario according to the fourth embodiment of the disclosure.

Firstly, in step S611, the processor 104 determines the first distance D1 between the first wearable device B1 and the second wearable device B2. In step S612, the processor 104 determines a height difference between the first wearable device B1 and the second wearable device B2. In the fourth embodiment, after obtaining the poses/positions of the first wearable device B1 and the second wearable device B2, the processor 104 can accordingly determine the first distance D1 and the height difference between the first wearable device B1 and the second wearable device B2, but the disclosure is not limited thereto.

In the fourth embodiment, the predetermined relative position can be a fourth predetermined relative position where the height difference between the first wearable device B1 and the second wearable device B2 is in a predetermined range and the first distance D1 between the first wearable device B1 and the second wearable device B2 is longer than a second distance threshold (i.e., the scenario shown in FIG. 6B), but the disclosure is not limited thereto.

In different embodiments, the second distance threshold can be any value characterizing that the first wearable device B1 and the second wearable device B2 is far enough to each other. The predetermined range can be any value characterizing that the heights of the first wearable device B1 and the second wearable device B2 are close to each other, but the disclosure is not limited thereto.

Therefore, in the scenario shown in FIG. 6B, the processor 104 can subsequently perform step S613. In step S613, in response to determining that the height difference is in a predetermined range and the first distance D1 is higher than a second distance threshold, the processor 104 determines that the relative position between the first wearable device B1 and the second wearable device B2 satisfies the fourth predetermined relative position, and the processor 104 accordingly determines that the posture of the user is a fourth specific posture.

In the fourth embodiment, the fourth specific posture can be a fourth standard posture for a person to be properly drawing a bow. That is, when the processor 104 determines that the relative position between the first wearable device B1 and the second wearable device B2 satisfies the fourth predetermined relative position, the processor 104 can accordingly determine that the posture of the user 399 is the fourth standard posture, but the disclosure is not limited thereto.

In the fourth embodiment, the host 100 can provide a visual content (e.g., the VR content) to the user 399, and the visual content can be adjusted in response to the posture of the user 399.

Figure 6C:
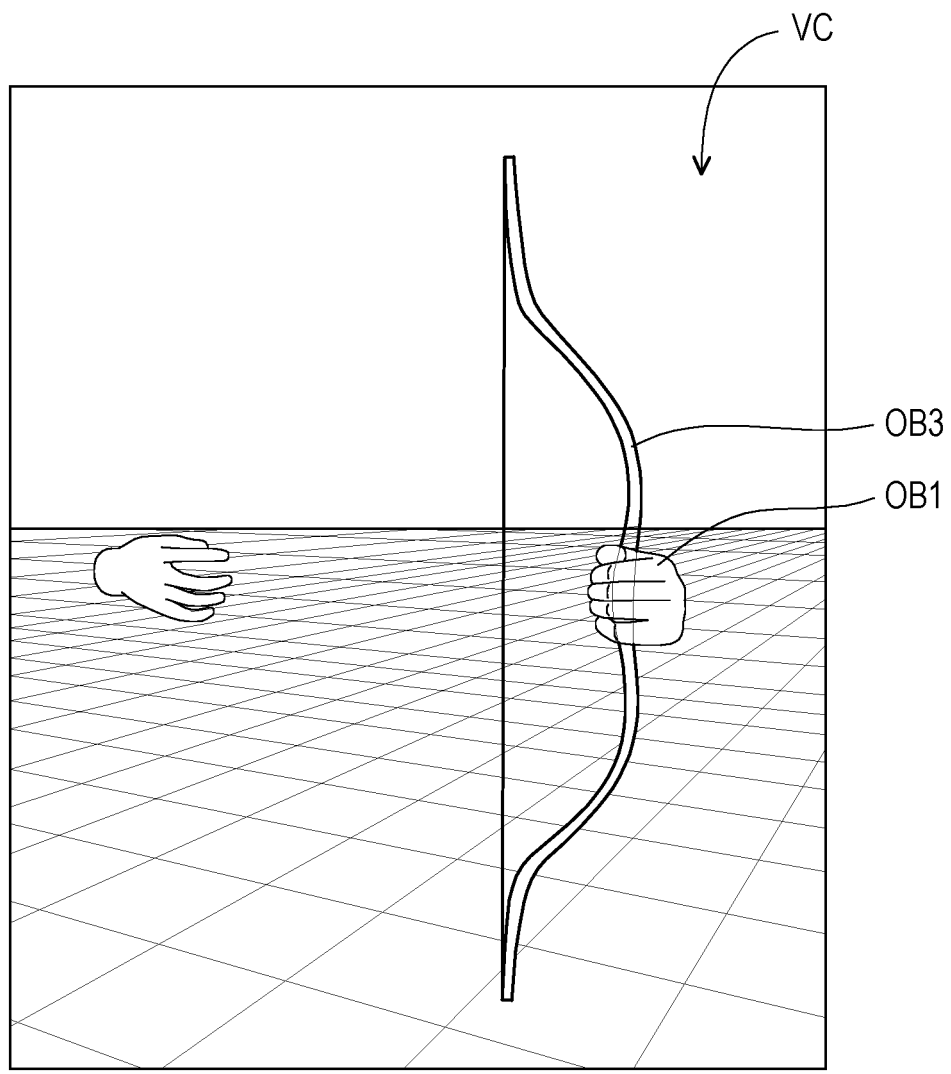
FIG. 6C shows a visual content adjustment according to the fourth embodiment of the disclosure.

See FIG. 6C, which shows a visual content adjustment according to the fourth embodiment of the disclosure. In FIG. 6C, the processor 104 can show a hand object OB1 corresponding to the hand of the user 399 in the visual content VC. In one embodiment, before determining that the posture of the user 399 is the fourth specific posture (e.g., the fourth standard posture), the hand object OB1 can be shown in an empty-handed state. That is, the hand object OB1 is shown as a bare hand carrying nothing.

In the fourth embodiment, in response to determining that the posture of the user is the fourth specific posture, the processor 104 can generate a handheld object OB3 in the visual content VC and adjust the hand object OB1 to be holding the handheld object OB3. In one embodiment, the handheld object OB3 can be a bow object, but the disclosure is not limited thereto.

In some embodiments, the processor 104 can further determine another relative position between the first wearable device B1, the second wearable device B2, and the HMD (e.g., the host 100). In one embodiment, during performing step S220, the processor 104 can further determine whether the another relative position between the first wearable device B1, the second wearable device B2, and the HMD satisfies another predetermined relative position.

In one embodiment, in response to determining the another relative position between the first wearable device, the second wearable device, and the head-mounted display satisfies the another predetermined relative position, the processor 104 can determine the posture of the user based on the relative position between the first wearable device B1 and the second wearable device B2 and the another relative position between the first wearable device B1, the second wearable device B2, and the HMD.

In one embodiment, in response to determining that at least one of distances and relative orientations between the first wearable device B1, the second wearable device B2, and the HMD are with a predetermined range, the processor 104 can determine that the another relative position between the first wearable device B1, the second wearable device B2, and the HMD satisfies the another predetermined relative position.

The disclosure further provides a computer readable medium for executing the method for determining a posture of a user. The computer readable medium is composed of a plurality of program instructions (for example, a setting program instruction and a deployment program instruction) embodied therein. These program instructions can be loaded into the host 100 and executed by the same to execute the method for determining a posture of a user and the functions of the host 100 described above.

In summary, the embodiments of the disclosure can determine the posture of the user based on the relative position between a first wearable device and a second wearable device. Therefore, the embodiments of the disclosure can achieve better tracking performance even when the hand(s) of the user is not in the FOV of the HMD and/or the hands of the user are holding objects.

It will be apparent to those skilled in the art that various modifications and variations can be made to the structure of the present invention without departing from the scope or spirit of the disclosure. In view of the foregoing, it is intended that the present disclosure cover modifications and variations of this invention provided they fall within the scope of the following claims and their equivalents.

What is claimed is:

1. A method for determining a posture of a user, adapted to a host, comprising:
   detecting a relative position between a first wearable device and a second wearable device;
   in response to determining that the relative position between the first wearable device and the second wearable device satisfies a predetermined relative position, determining the posture of the user at least based on the relative position between the first wearable device and the second wearable device;
   wherein the predetermined relative position comprises a first predetermined relative position, and the method further comprises:
   obtaining a position of a reference device and accordingly determining a first area;
   determining a first distance between the first wearable device and the second wearable device;
   in response to determining that the first wearable device and the second wearable device are in the first area and the first distance is lower than a first distance threshold, determining that the relative position between the first wearable device and the second wearable device satisfies the first predetermined relative position, and accordingly determining that the posture of the user is a first specific posture.

2. The method according to claim 1, wherein the predetermined relative position further comprises a second predetermined relative position, and the method further comprises:
   obtaining a position of a reference device and accordingly determining a second area;
   in response to determining that the first wearable device is in the second area and the second wearable device is above the first wearable device, determining that the relative position between the first wearable device and the second wearable device satisfies the second predetermined relative position, and accordingly determining that the posture of the user is a second specific posture.

3. The method according to claim 1, wherein the predetermined relative position further comprises a second predetermined relative position, and the method further comprises:

obtaining a position of a reference device and accordingly determining a second area, wherein the reference device is a head-mounted display;

in response to determining that the first wearable device is in the second area and the second wearable device is above the first wearable device, determining that the relative position between the first wearable device and the second wearable device satisfies the second predetermined relative position;

in response to determining that the relative position between the first wearable device and the second wearable device satisfies the second predetermined relative position and the head-mounted display faces forward, determining that the posture of the user is a second specific posture.

4. The method according to claim 1, wherein the predetermined relative position further comprises a third predetermined relative position, and the method further comprises:

obtaining a field of view of a head-mounted display and defining a reference area in the field of view;

in response to determining that the first wearable device and the second wearable device are in the reference area of the field of view, determining that the relative position between the first wearable device and the second wearable device satisfies the third predetermined relative position, and accordingly determining that the posture of the user is a third specific posture.

5. The method according to claim 1, wherein the predetermined relative position further comprises a third predetermined relative position, and the method further comprises:

obtaining a field of view of a head-mounted display and defining a reference area in the field of view;

in response to determining that the first wearable device and the second wearable device are in the reference area of the field of view, determining that the relative position between the first wearable device and the second wearable device satisfies the third predetermined relative position;

in response to determining that the relative position between the first wearable device and the second wearable device satisfies the third predetermined relative position and a specific object is detected to be in the reference area of the field of view, determining that the posture of the user is a third specific posture.

6. The method according to claim 5, wherein the specific object is a gun, and the method further comprises:

in response to determining that the first wearable device and the second wearable device experience a backlash force, determining that the gun has been triggered to fire.

7. The method according to claim 5, further comprising:

controlling a front camera of the head-mounted display to capture an image based on the field of the view;

inputting the image to a pre-trained model, wherein the pre-trained model detects whether the specific object exists in the reference area of the field of view based on the image.

8. The method according to claim 1, wherein the predetermined relative position further comprises a fourth predetermined relative position, and the method further comprises:

determining a first distance between the first wearable device and the second wearable device;

determining a height difference between the first wearable device and the second wearable device;

in response to determining that the height difference is in a predetermined range and the first distance is higher than a second distance threshold, determining that the relative position between the first wearable device and the second wearable device satisfies the fourth predetermined relative position, and accordingly determining that the posture of the user is a fourth specific posture.

9. The method according to claim 1, further comprising:

providing a visual content, wherein the visual content comprises a hand object corresponding to a hand of the user;

in response to determining that the posture of the user is a specific posture, generating a handheld object in the visual content and adjusting the hand object to be holding the handheld object.

10. The method according to claim 9, wherein the handheld object is a gun object or a bow object.

11. The method according to claim 1, wherein the first wearable device and the second wearable device are smart bracelets worn by the user.

12. The method according to claim 1, further comprising:

in response to determining that a variation of the relative position between the first wearable device and the second wearable device indicates that the posture of the user sequentially change among a plurality of specific postures, determining that the user has passed a sequence of posture test.

13. The method according to claim 1, further comprising:

determining another relative position between the first wearable device, the second wearable device, and a head-mounted display, and the step of determining the posture of the user at least based on the relative position between the first wearable device and the second wearable device comprises:

in response to determining the another relative position between the first wearable device, the second wearable device, and the head-mounted display satisfies another predetermined relative position, determining the posture of the user based on the relative position between the first wearable device and the second wearable device and the another relative position between the first wearable device, the second wearable device, and the head-mounted display.

14. A host, comprising:

a non-transitory storage circuit, storing a program code;

a processor, coupled to the storage circuit and accessing the program code to perform:

detecting a relative position between a first wearable device and a second wearable device;

in response to determining that the relative position between the first wearable device and the second wearable device satisfies a predetermined relative position, determining the posture of the user at least based on the relative position between the first wearable device and the second wearable device;

wherein the predetermined relative position comprises a first predetermined relative position, and the processor further performs:

obtaining a position of a reference device and accordingly determining a first area;

determining a first distance between the first wearable device and the second wearable device;

in response to determining that the first wearable device and the second wearable device are in the first area and the first distance is lower than a first distance threshold, determining that the relative position between the first wearable device and the second wearable device satisfies the first predetermined relative position, and accordingly determining that the posture of the user is a first specific posture.

15. The host according to claim 14, wherein the predetermined relative position further comprises a second predetermined relative position, and the processor further performs:

obtaining a position of a reference device and accordingly determining a second area;

in response to determining that the first wearable device is in the second area and the second wearable device is above the first wearable device, determining that the relative position between the first wearable device and the second wearable device satisfies the second predetermined relative position, and accordingly determining that the posture of the user is a second specific posture.

16. A non-transitory computer readable medium, the computer readable medium recording an executable computer program, the executable computer program being loaded by a host to perform steps of:

detecting a relative position between a first wearable device and a second wearable device;

in response to determining that the relative position between the first wearable device and the second wearable device satisfies a predetermined relative position, determining the posture of the user at least based on the relative position between the first wearable device and the second wearable device;

wherein the predetermined relative position comprises a second predetermined relative position, and the method further comprises:

obtaining a position of a reference device and accordingly determining a first area;

determining a first distance between the first wearable device and the second wearable device;

in response to determining that the first wearable device and the second wearable device are in the first area and the first distance is lower than a first distance threshold, determining that the relative position between the first wearable device and the second wearable device satisfies the first predetermined relative position, and accordingly determining that the posture of the user is a first specific posture.

17. The method according to claim 13, comprising:

in response to determining that at least one of distances and relative orientations between the first wearable device, the second wearable device, and the head-mounted display are with a predetermined range, determining that the another relative position between the first wearable device, the second wearable device, and the head-mounted display satisfies the another predetermined relative position.

* * * * *